(12) United States Patent
Franklin et al.

(10) Patent No.: US 6,397,037 B1
(45) Date of Patent: May 28, 2002

(54) METHOD AND APPARATUS FOR IMPROVING CLASSROOM AMPLIFICATION SYSTEMS AND OTHER RF-TYPE AMPLIFICATION SYSTEMS

(75) Inventors: David Franklin, Somerville, MA (US); Michael Steele, Seaford, NY (US)

(73) Assignee: Audiological Engineering Corporation, Somerville, MA (US)

( * ) Notice: Subject to any disclaimer, the term of this patent is extended or adjusted under 35 U.S.C. 154(b) by 0 days.

(21) Appl. No.: 09/424,915

(22) PCT Filed: Jun. 2, 1998

(86) PCT No.: PCT/US98/11127

§ 371 (c)(1),
(2), (4) Date: Dec. 1, 1999

(87) PCT Pub. No.: WO98/56106

PCT Pub. Date: Dec. 10, 1998

Related U.S. Application Data (60) Provisional application No. 60/048,329, filed on Jun. 2, 1997.

(51) Int. Cl.[7] .................................................. H04H 1/00
(52) U.S. Cl. ........................ 455/3.01; 455/3.06; 455/575
(58) Field of Search ................................ 455/3.01, 6.06, 455/462, 463, 465, 575, 95

(56) References Cited

U.S. PATENT DOCUMENTS

| | | | |
|---|---|---|---|
| 5,239,683 A | * 8/1993 | Usui | 455/63 |
| 5,426,641 A | * 6/1995 | Afrashteh et al. | 455/116 |
| 5,589,796 A | * 12/1996 | Alberth, Jr. et al. | 455/126 |
| 5,818,328 A | 10/1998 | Anderson et al. | 340/384.72 |
| 5,850,601 A | 12/1998 | Anderson et al. | 455/426 |

* cited by examiner

Primary Examiner—Daniel Hunter
Assistant Examiner—Thuan T. Nguyen (57) ABSTRACT

An RF-type amplification system, such as a classroom amplification system, employs technology adapted from a cordless telephone system to overcome interference. The amplification system includes a portable remote unit (87) and a base unit (82). Remote unit (87) includes: a microphone (151) for detecting a voice and generating corresponding voice signals; a transmitter (160, 161) which generates RF signals containing the voice signals as well as control signals provided by the central processing unit (179) of remote unit (87), and an antenna (168) for transmitting the RF signals and for receiving RF signals from base unit (82). Base unit (82) includes an antenna (107) which receives the RF signals transmitted by the remote unit and a receiver (108, 114, 115, 117) which detects the RF signals and separates the RF signals into the voice signals and control signals. The control signals are identified by a code detector (118) of base unit (82) and evaluated by a CPU (130). If the values of the control signals are as expected, the voice signals are processed through a speech network (121) and provided at a communications interface to an audio power amplifier (147) which amplifies the voice signals and supplies the voice signals to speakers which audibly project the voice signals as sound. Base unit (82) further includes a transmitter (133, 135) for generating RF signals containing control signals, but no voice signals, that are transmitted to remote unit (87), thereby effecting one-way transmission of voice signals and two-way transmission of control signals between remote unit (87) and base unit (82).

24 Claims, 3 Drawing Sheets

METHOD AND APPARATUS FOR IMPROVING CLASSROOM AMPLIFICATION SYSTEMS AND OTHER RF-TYPE AMPLIFICATION SYSTEMS

This ApplN is a 371 of PCT/US 98/11127 filed Jun. 2, 1998 which claims benefit of Prov. No. 60/048,329 filed Jun. 2, 1997.

BACKGROUND OF THE INVENTION

1. Field of the Invention

The present invention relates to a method and apparatus for transmitting and receiving RF signals in an amplification system, wherein sound detected by a microphone is transmitted as an RF signal to a remote receiver, audio-amplifier and loudspeaker which reproduces the sound. More particularly, the present invention relates to a classroom amplification system which employs technology found in cordless telephone transmitters/receivers to transmit and receive RF signals.

2. Description of the Related Art

As is well known in audiological and teaching communities, many children in school, although classified as having normal hearing, have transient hearing loss due primarily to otitis media, more commonly referred to as middle ear infection. For reasons not entirely clear, this kind of infection has been increasing in prevalence for at least the past 20 years. The National Center for Health Statistics has developed data that indicates that this affliction, with accompanying mild hearing losses, increased by almost 45% in the period 1981 to 1988 and that the most common cause for doctor visits for children aged 15 or less during the period 1975 through 1990 was otitis media, showing an increase of 150% during that study period. For children less than 2 years of age, the increase in the same period was 224%. For 1990 alone, the number of children 15 or under reported as having otitis media was a staggering 19.8 million according to this same source.

It is well documented that this trend has resulted in some portion of so-called "normally hearing children" in classrooms actually being temporarily "hearing impaired" at least to some degree. One study conducted at a Midwestern suburban school, involving 282 children from six kindergarten and six first grade classrooms, none of whom was classified as hearing impaired, showed a failure rate when screened for hearing loss according to recommended standards as follows:

For a screening in the fall season . . . 33% failed

For a screening in the winter season . . . 34% failed

For a screening in the spring season . . . 27% failed

Thus, at any given time, between 27% and 34% of the children had some degree of hearing loss and, by means of questionnaires filled out by the parents, it was established that these transient hearing losses were directly associated with episodes of otitis media. Other studies of regular classrooms have shown similar results. Even more dramatic, studies in "special needs" classrooms have indicated the averages rise to about 75% of the children showing similar transient hearing losses with similar etiologies as causes.

Hearing losses in children, particularly in the earlier grades, can lead to poor performance, reduced classroom participation and development of poor learning and/or study skills. Thus, transient hearing loss is a growing problem with extremely serious consequences both for the children suffering hearing loss and for society at large.

Children with known, permanent hearing deficits are usually fitted with hearing aids or so-called "classroom trainers." This approach to alleviating a hearing loss problem is not practical in the context of transient hearing loss because of the large number of children afflicted, and because of the transient/floating characteristics of the problem, where at any given time it is not known which children are affected.

To address this problem, since roughly 1980, a number of researchers have been experimenting with what have come to be called "classroom amplification systems". In essence, these systems depend on some kind of battery operated transmitter and microphone worn by the teacher, a receiver/audio-amplifier installed in the classroom, and a number of loudspeakers arrayed about the classroom. These systems amplify the teacher's voice throughout the room so all children can hear without strain, even if they have mild, untreated hearing loss. The success of this approach has led to a growing number of companies whose primary focus is to design and install such systems nationwide.

In practice, the unsolved problem of signal interference in classroom amplification systems has limited deployment of such systems. Typically, radio frequency (RF) transmission is used to couple the teacher's voice to the receiver; however, the reserved band for this kind of hearing assistance system (72 MHz to 76 MHz) is subject to interference from a variety of nearby sources such as television stations, CB transmitters, incidental interference from electrical appliances and the like. Other frequency bands, such as 49 MHz, 216 MHz, and 900 MHz, have been used in an attempt to obtain better performance; however, to date, the interference problem largely has not been solved.

At present, the best of the RF receiver/transmitters in the hearing impaired community incorporate at most 10 to 15 channels of analog narrowband FM capability with no special encoding or other means for minimizing the effects of interfering transmitters. Interference is typically avoided in such receivers by manually switching channels in both the transmitter and receivers independently of one another.

As a result of the interference problem, seldom can more than a few classrooms in any school have RF amplification systems before serious system functional degradation occurs due to interference among the adjacent classrooms. Furthermore, performance of classroom amplification systems may be degraded by interference from intermittent or permanent sources of RF interference in the vicinity of the school, depending on the school's location. Thus, despite the development of classroom amplification system technology over the course of many years, there remains a long felt need for a classroom amplification system capable of eliminating or mitigating the effects of interference with minimal user involvement.

SUMMARY OF THE INVENTION

It is an object of the present invention to provide an improved system and method for solving interference problems in classroom amplification systems and other RF-type amplifications systems.

It is another object of this invention to provide a simple and inexpensive approach, using RF transmitters and receivers from another industry not associated with the hearing impaired, to improve the performance of classroom amplification systems and other RF-type amplifications systems.

It is a further object of the present invention to automate RF channel selection in a classroom amplification system or other RF-type amplification system, such that minimal user involvement is required to identify and switch to a low-interference channel.

It is yet another object of the present invention to adapt the technology employed in cordless telephone systems to classroom amplification systems and other RF-type amplification systems.

It is yet a further object of the present invention to modify the circuitry of a cordless telephone system to broaden the bandwidth of the system so that the circuitry is suitable for use in an amplification system.

The aforesaid objects are achieved individually and in combination, and it is not intended that the present invention be construed as requiring two or more of the objects to be combined unless expressly required by the claims attached hereto.

According to the present invention, an RF-type amplification system, such as a classroom amplification system employs interference reduction technology adapted from a cordless telephone system. In particular, the amplifier system includes a portable remote unit which incorporates features of a portable handset of a cordless telephone and a base unit which incorporates features of a base unit of a cordless telephone. Cordless telephones rely on RF transmission between the portable handset and the stationary base unit that is connected by wire to the telephone system and which serves as a battery charger for the handset when not in use. The transmission techniques employed in cordless telephones incorporate a number of features that reduce or eliminate interference. The present inventors have recognized that the technology employed in cordless telephones can be adapted for use in the field of RF-type amplification systems, such as classroom amplification systems.

More specifically, the remote unit of the amplification system of the present invention includes a microphone for detecting a voice, such as that of an instructor, and for generating corresponding electronic voice signals. A transmitter of the remote unit generates RF signals containing the voice signals (which, optionally, can be scrambled by the transmitter) as well as control signals provided by the central processing unit (CPU) of the remote unit. The control signals include a frequency identity code which indicates the remote unit's transmit frequency, a handshake code which is earlier downloaded from the base unit to the remote unit and which allows the base unit to uniquely identify the remote unit as the source of the transmitted RF signals, and a descrambling code which allows the base unit to descramble the voice signals transmitted within the RF signal. The remote unit further includes an antenna for transmitting the RF signals and for receiving RF signals from the base unit. Control signals received by the remote unit from the base unit are identified by a code detector and sent to the CPU for analysis.

The remote unit can be formed by modifying a conventional remote unit (handset) of a cordless telephone by: removing the packaging (i.e., the handset housing) and the alphanumeric keypad of the handset; removing the earpiece and the built-in microphone; adding an external microphone; and repackaging the function keys, circuitry (e.g., transmitter, receiver, CPU, etc.) and antenna with a housing suitable for attachment to an instructor's belt or the like. The resulting remote unit includes function keys for activating and deactivating the remote unit ("ON" and "OFF" keys), a "MUTE" key for muting the voice signal output from the base unit, and a "Channel Scan" key that allows the user to initiate an automatic channel scanning mode to identify a transmission channel that is substantially free of interference. The remote unit further includes a rechargeable battery which is charged by a battery charger of the base unit.

The base unit includes an antenna which receives the RF signals transmitted by the remote unit and a receiver which detects the RF signals and separates the RF signals into the constituent voice signals and control signals. The control signals are identified by a code detector of the base unit and evaluated by the CPU of the base unit. If the frequency identity code, handshake code and descrambling code transmitted by the remote unit and received by the base unit have the values expected by the base unit, the voice signals are processed through a speech network and provided at a communications interface of the base unit to an audio power amplifier which amplifies the voice signals and provides the amplifies voice signals to room speakers which audibly project the voice signals as sound.

The communications interface of a cordless telephone is designed to receive an "off-hook" current from a telephone line, which "off-hook" signal activates the system when the handset is removed from its cradle on the base unit. In the amplification system of the present invention, this "off-hook" signal is provided by a DC power source which supplies a constant DC voltage to the communications interface whenever the system is in use. The base unit further includes a transmitter for transmitting control signals, but not voice signals, to the remote unit. Thus, there is one-way transmission of voice signals (from the remote unit to the base unit) and two-way transmission of control signals between said remote unit and said base unit.

When the system user (e.g., an instructor) detects an unacceptable amount of interference on the transmission channel, the user can effect automatic selection of a low-interference channel by selecting the "Channel Scan" key. Selection of the "Channel Scan" key causes the remote unit to send a control signal to the base unit. In response to the control signal, the base unit scans different frequency channels by adjusting the frequency of a local oscillator in the receiver until a channel substantially free of interference is identified. The base unit then transmits this information to the remote unit which begins transmitting at the indicated frequency to avoid interference.

The control signals and the channel scanning features advantageously minimize interference in the amplification system, even where numerous sources of interference are present in the vicinity of the system.

Optionally, the communication circuitry of a cordless telephone can be further modified for use in an amplification system to broaden the bandwidth of the voice signals being transmitted to the base station. According to one approach, the bandpass filter in the remote unit, which limits the bandwidth of the voice signal, can be bypassed. According to another approach, a compressor circuit can be placed upstream of the bandpass filter, and an expander circuit can be place downstream of the receiver in the base unit to obtain a wider bandwidth while still employing the bandpass filter of the original cordless telephone system.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE PREFERRED EMBODIMENTS

It is observed by the present inventors that the extensive research and development of "cordless" telephones (i.e., telephones whose handset transmits and receives RF signals from a base unit, thereby not requiring a cord attachment to the handset) have resulted in inexpensive but very sophisticated transmitters and receivers whose capabilities far exceed those found even in the best RF systems currently being designed for hearing impaired communities. In particular, cordless telephone systems employ a number of techniques for reducing or avoiding interference. For example, it is common for cordless telephone systems to incorporate specific digital "handshaking" to assure that each unit in a transmitter/receiver pair receives messages only from the other unit. These transmitter/receiver pairs typically have automatic channel scanning features that enable a user to change channels easily and simultaneously with a single key stroke with further assurance that the channel change will be to a "clear" channel (one substantially free of interference). Many such cordless telephone systems include voice scrambling circuitry to assure that, even if there is some form of interference, it will appear as noise or garbled speech, so that there is no confusion as to the source. Such systems, even in the lower price and technological range, offer as many as 40 channels or more. At the higher end of the cordless telephone price and technology range, techniques such as spread-spectrum encoding, digital encoding of other descriptions, frequency agile automatic channel scanning, and as many as 170 channels or more are available to decrease the possibility of interference even further.

Classroom amplification systems and cordless phones have been developed and have existed in parallel for many years without any recognition that these technologies may be related or that certain aspects of cordless phone technology potentially could have application in the field of classroom amplification systems. In particular, throughout the years of largely unsuccessful attempts to solve the interference problems that have long plagued classroom amplification systems, there has been no recognition or appreciation in the field of classroom amplification systems that cordless phone technology may be useful in addressing interference problems, and no efforts have been made to apply technology developed for cordless phones to classroom amplification systems or to other RF-type amplification systems.

The present inventors have recognized that the technology employed in cordless telephone systems can also be employed in RF-type amplification systems, such as classroom amplification systems, to address the unsolved problem of interference. In accordance with the present invention, an improved classroom amplification system incorporates technology adapted from cordless telephone systems.

A typical cordless telephone system includes a base unit and a battery-powered remote unit. The base unit is connected via a transformer to a power supply, such as a conventional AC power source, and transmits signals to and receives signals from a telephone network via a wire connection to a telephone line wall outlet or the like. The base unit includes a transmitter and an antenna for transmitting voice signals received over the telephone line to the remote unit as RF signals, along with control signals. The base unit further includes a receiver for receiving RF voice signals and control signals from the remote unit. The voice signals received by the base unit are conveyed to the telephone line via the wire connection.

The remote unit of a typical cordless telephone system has the shape of a conventional telephone handset, with a microphone disposed at one end, which is held near the user's mouth, for detecting the user's voice, and an earpiece at the other end, which is held near the user's ear, for generating audible voice signals from the RF voice signals received from the base unit. The remote unit also includes a transmitter and an antenna for transmitting RF voice signals of the user's voice detected by the microphone and control signals, and a receiver for receiving the RF voice and control signals from the base unit. An alphanumeric keypad disposed on the remote unit allows the user to enter digital information, such as a phone number or control information, which information is transmitted to the base unit. The keypad further includes function keys, such as the "ON" key; the "OFF" key; the "MUTE" key; and the "Channel Scan" key. When not in use, the remote unit can rest in a cradle of the base unit, while a battery charger of the base unit charges the battery of the remote unit.

In recognition of the special requirements of classroom amplification systems, and the different requirements of cordless telephones, modifications in both the functional operation and packaging of telephone receiver-transmitter equipment are required to make such equipment useful in this new application as a portion of a classroom amplification system.

Figure 1:
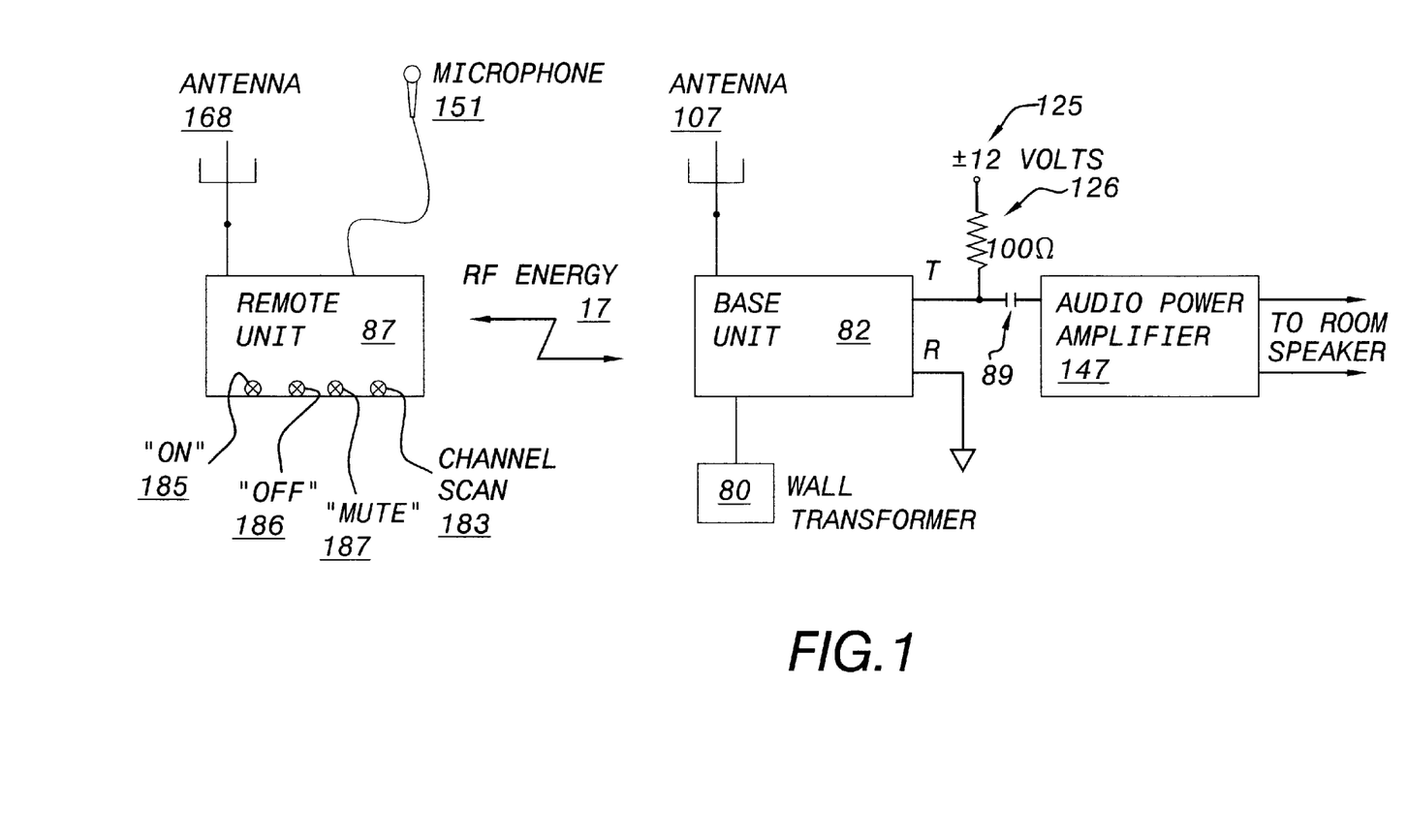
FIG. 1 is a diagrammatic illustration of a classroom amplification system realized by using a modified portable "cordless" telephone circuit in accordance with an exemplary embodiment of the present invention.

FIG. 1 is a diagrammatic illustration of a classroom amplification system realized by using a modified portable (cordless) telephone circuit in accordance with an exemplary embodiment of the present invention. Referring to FIG. 1, there is shown a portable remote unit 87 which communicates with a base unit 82 via RF signals. While employing certain communications circuitry and hardware from a cordless telephone remote unit (handset), the remote unit 87 differs from cordless telephone remote unit in a number of important respects.

Whereas cordless telephone systems require an alphanumeric keypad as part of the remote battery-operated receiver/transmitter unit to enable phone dialing, it is preferable that classroom amplification systems have no such keypad. Hence, unlike the cordless telephone remote unit, remote unit 87 does not include an alphanumeric keypad. However, some of the key-operated functions of the telephone keypad are still required in the remote unit 87 of the present invention. As shown in FIG. 1, these function keys include: the "ON" key 185, which turns the unit on; the "OFF" key 186, which turns the unit off; the "MUTE" key 187, which temporarily mutes the voice signal reproduced by the system speakers; and the "Channel Scan" key 183, which enables the automatic scan feature which selects a "clear" channel in the event of interference.

Whereas the battery operated cordless telephone remote unit requires an internal (built-in) microphone, which is presented to the user's mouth when he uses the telephone, fort he classroom amplification system, an external or remote microphone 151 (FIG. 1) is required, because the transmitter is usually worn by the instructor and clipped to the waist. Microphone 151 can be a tie-clip microphone, a head-worn microphone, or a so-called collar microphone, wherein a jack and appropriate bias voltage and load (if required) can be supplied for the microphone. Further, while the remote unit of the cordless telephone system requires an earpiece, in the classroom amplification application, the remote unit functions only as a transmitter, and no earpiece is required.

In view of these differences, remote unit 87 can be formed by modifying a cordless telephone remote unit in the following manner: removing the packaging (i.e., the handset housing) and the alphanumeric keypad; removing the earpiece and the built-in microphone; adding an external microphone; and repackaging the function keys, circuitry (e.g., transmitter, receiver, CPU, etc.) and antenna with a housing suitable for attachment to an instructor's belt or the like.

Referring again to FIG. 1, in operation, an instructor's voice detected by microphone 151 is converted into an RF signal by remote unit 87 and transmitted via remote unit antenna 168 through the medium of RF energy 17 and is received by antenna 107 located on the stationary base unit 82. Antennas 168 and 107 can be any antenna suitable for RF transmission and reception at the operating frequencies of the system. In particular, antenna 169 of remote unit 87 can be packaged within the housing of remote unit 87 or can be a retractable antenna that extends from the housing.

Base unit 82 of the amplification system employs features of a typical cordless telephone base unit. As with remote unit 87, however, base unit 82 is designed for use in an amplification system and therefore differs from a typical cordless telephone base unit in a number of important respects.

Base unit 82 is powered by wall transformer 80 in a manner similar to a typical cordless telephone base unit. However, in the usual telephone application, the base unit is also powered by a second line signal received at terminals T and R connected to a telephone line via a connecting wire. The cordless telephone base unit input connected to the telephone line is configured to sense an "off-hook" current supplied by the telephone company on the phone line when the phone circuit is closed by action of removing the handset and activating its circuit. It is this "off-hook" current that operates a relay thus making the transmitter/receiver circuit active.

For operation as part of a classroom amplification system, no such "off-hook" current is supplied. That is, in contrast to the telephone application, in the present invention, no line signal is received at terminals T and R of base unit 82 (FIG. 1),; since base unit 82 is not connected via a wire to a telephone line wall outlet or the like. Thus, it is necessary to provide a power source to terminals T and R of base unit 82 along with an appropriate impedance to enable the system to operate properly. This requirement is met by applying an appropriate DC bias voltage across terminals T and R whenever the classroom amplification system is operational. By way of example, a voltage of approximately plus or minus 12 volts DC is supplied from a voltage source 125 via a load of approximately 100 ohms, (shown as resistor 126) to terminal T (with terminal R being grounded). This combination of resistor and voltage operates as an internal relay (shown in FIG. 2) which in effect "answers the phone", making it operational. The communication interface (terminals T and R) of base unit 82, which is normally connected to a phone line in the telephone application, is connected to the input of an audio power amplifier 147 in the amplification system.

The internal circuits in base unit 82, among other operations, convert the RF signal received from remote unit 87 into a voice signal which is provided as an output at terminals T and R and is used as an input to audio power amplifier 147, which in turn drives the room loudspeakers (not shown). To protect the audio amplifier 147, it may be necessary to further supply a decoupling capacitor 89 of sufficient magnitude to decouple the 12 volt source 125 from the input of audio amplifier 147, but still pass the desired speech signal.

Figure 2:
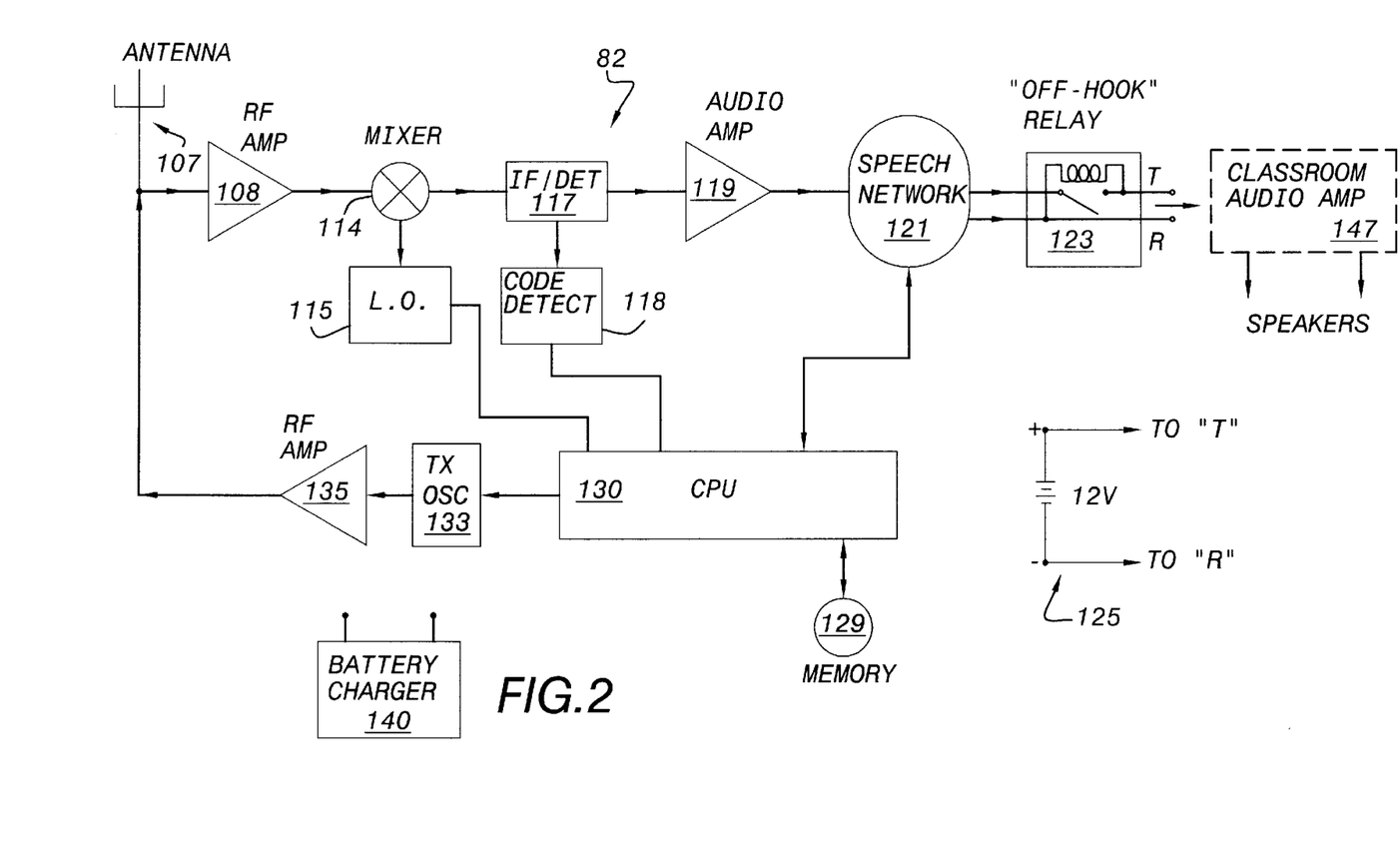
FIG. 2 is a schematic illustration of a base unit of the classroom amplification system in accordance with the exemplary embodiment of the present invention.

FIG. 2 is a schematic illustration of the wireless base unit 82, adapted from a telephone base unit, wherein, for simplicity, only the portions of the transmitter and receiver relevant to the present invention are illustrated. A cordless telephone system typically contains the battery charger/management system for the remote receiver/transmitter. This function is likewise required for the classroom amplification system. As shown in FIG. 2, base unit 82 includes a battery charger 140 having terminals adapted to receive charge terminals 193 of rechargeable battery pack 190 of remote unit 87 (see FIG. 3) when remote unit 87 is not in use.

Antenna 107 receives the RF signal transmitted by the remote unit 87, which signal contains both audio and digital control signal data. This RF signal is amplified by RF amplifier 108. The amplified RF signal and a signal generated by a local oscillator 115 are supplied to a mixer 114 which down-converts the amplified RF signal to an intermediate frequency (IF) signal. The IF signal is then delivered to an IF detector circuit 117. As part of its operation, IF detector circuit 117 separates the two portions of the signal into their respective elements; one portion being the audio component which is delivered to an audio amplifier 119; and the other portion being a digital signal which is delivered to a code detector 118 which is connected to a central processing unit (CPU) 130 of the base unit.

After amplification in audio amplifier 119, the audio signal is delivered to a speech network 121. If the code detector 118 and CPU 130 determine that this audio signal is a legitimate one, derived from the proper remote transmitter 87, the audio signal is delivered via the activated "off-hook relay" 123 to a classroom audio power amplifier 147 which drives the classroom loudspeakers which project the instructor's voice throughout the classroom.

According to the usual methods employed in modern wireless telephones, the signal delivered to code detector 118 contains three pieces of digital information. The first piece of information is a code for the particular frequency being used by the remote transmitter unit 87. Since the selectivity of this receiver, as determined by the combination of mixer 114, local oscillator 115, and IF detector/narrowband amplifier 117, is very narrow, any RF signal received which results in an output through the tuned IF stage, must be of the proper RF frequency. However, if it is not accompanied by the proper frequency identity code as determined by code detector 118 and CPU 130, the CPU 130 will reject this signal and any derived speechband frequencies by sending an appropriate control signal to speech network 121 which instructs speech network 121 not to convey voice signals to the classroom audio power amplifier 147.

The second code contained in the signal recovered by code detector 118 is a "handshake" code. This code is stored in the CPU memory 180 (see FIG. 3) of the remote unit 87 whenever the remote unit 87 is placed in its charger 140 which, as illustrated in FIG. 2, is a part of the base unit 82. More specifically, the handshake code, which is stored in memory 129 of base unit 82, is retrieved by CPU 130 of base unit 82 and downloaded to CPU memory 180 of remote unit 87 (see FIG. 3) whenever remote unit 87 is being charged by charger 140. If this code does not match, CPU 130, via a control signal to speech network 121, will prevent any audio output from occurring through relay 123.

The third digital code contained in this signal is a descrambling code which is sent to the speech network 121 from CPU 130. The action of the descrambler signal is to decode the speech signal sent from the remote transmitter 87. The purpose of scrambling the speech-band signal is to provide security for normal phone operation. That is, any RF receiver nearby the remote transmitters used to link the remote phone and its base unit cannot be used to listen to a conversation. In the present invention, where security is not a serious consideration, this feature still plays a valuable role in that, if any speech signal is intercepted by the base unit (i.e., an interfering signal not from the teachers remote unit), it will be acted upon by the descrambler to make it incomprehensible and incapable of being confused with the instructor's voice by students.

Even with these safeguards, interference can occur. Specifically, if a "legitimate" RF signal is received by base receiver 82 as transmitted by remote transmitter unit 87, then all three code signals required to allow output from relay 123 are present, and output will occur. If an interfering RF signal of the correct frequency is concurrently received by base receiver 82, it will be present in the audio output, along with the legitimate RF signal. Even though this output will generally be scrambled speech or simply noise, it is of course preferable that no such interference be present. Under these conditions, the action of the scan function built into remote transmitter 87 comes into play. In this situation, the user of the remote transmitter unit 87 pushes the channel scan button 183 (see FIG. 3) which results in a scan code appearing in code detector 118. The combined action of this new code, CPU 130 and speech network 121 progressively changes the frequency of oscillator 115 and looks for a new channel substantially free of speech frequency noise. When this action is completed, a new RF frequency code is transmitted to remote unit 87, and a new transmitter frequency is selected for transmitter (TX) oscillator 133, which is supplied to antenna 107 via RF amplifier 135 and transmitted to remote unit 87. When the action is completed, each unit operates on new transmit/receive frequencies.

Figure 3:
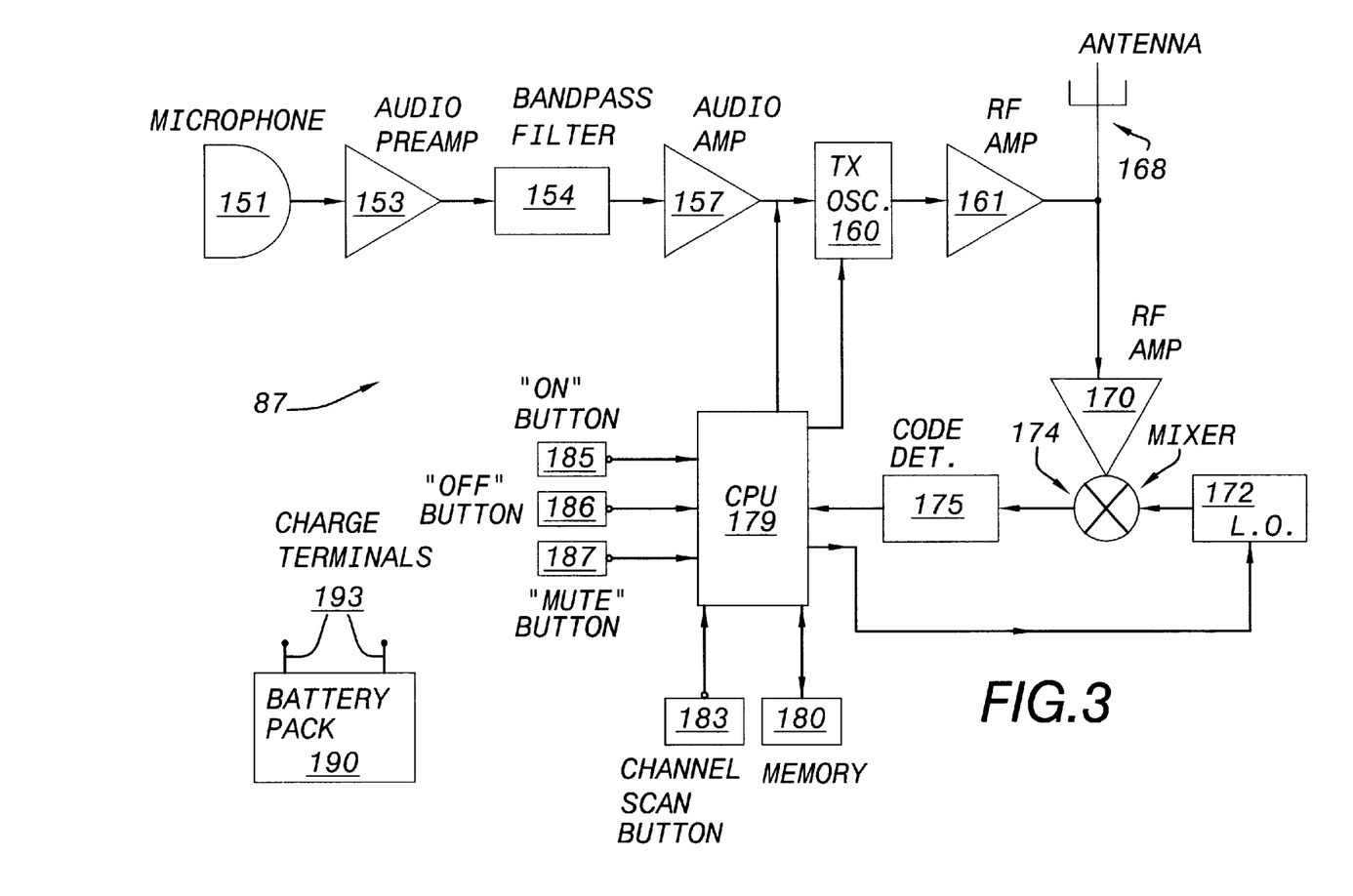
FIG. 3 is a schematic illustration of a portable, remote transmitter/receiver unit of the classroom amplification system in accordance with the exemplary embodiment of the present invention.

It will be understood that the transmit frequency for the remote transmitter 87 and the transmit frequency for the base unit 82 are never the same. Hence, one has (as with normal telephone applications) the remote unit "receiver" tuned to the base unit transmitter frequency and the base unit "receiver" tuned to the remote unit transmitter frequency.

FIG. 3 is a schematic illustration of the remote transmitter/receiver unit 87 in accordance with the exemplary embodiment of the present invention, wherein only the portions of the transmitter, receiver and control elements relevant to the present invention are shown. Referring to FIG. 3, a microphone 151 detects sound, such as the voice of an instructor. Microphone 151 can be any type of microphone suitable for detecting voice signals in the context of a portable device, including, but not limited to, a head-worn or "tie clip" microphone. The output of microphone 151 is amplified by audio-preamplifier 153 and bandpass filtered by bandpass filter 154. The resultant speech signal, by action of filter 154 is limited to the frequency range of approximately 300 Hz to 3300 Hz, as required for telephony, and is then amplified by amplifier 157 and presented to a transmitter (TX) oscillator circuit 160 where it is converted into the appropriate RF frequency for transmission via antenna 168 following amplification by RF amplifier 161.

In most modern wireless telephones the transmitter oscillator will have a second function, under control of the CPU, of scrambling the voice signal for the reasons described above in relation to FIG. 2. Additionally, CPU 179 adds the aforementioned digital codes into the audio signal and these codes are likewise converted by transmitter oscillator 160 into the appropriate RF format for transmission along with the converted voice signal.

When the composite signal is received by base unit 82, a "handshake" code is transmitted back to remote unit 87 and received via antenna 168, amplified by RF amplifier 170, and converted to a lower IF frequency by mixing, in mixer 174, the RF signal with a signal generated by a local oscillator 172. In the present invention for classroom amplification systems, unlike the application as a telephone, this received signal contains only digital encoding data, not speech data, so the portion of FIG. 3 dealing with this received signal indicates only the signal path for the digital portion of the received signal.

The received digital signal is fed to code detector 175 and then to the CPU 180. If the instructor does not request a new channel by pressing channel scan button 183 as described previously (which is generally the case under low-interference conditions), and the codes received match those that had been previously downloaded into remote unit 87, then the handshake is complete and the instructor's speech is transmitted as previously described. If the instructor does press the channel scan button 183, channel scanning is effected as previously described. Other instructor actions, such as pressing "OFF" button 186 or "Mute" button 187, result in appropriate responses controlled by CPU 179 as shown.

The telephone bandwidth is limited by law (in the U.S.) to the band 300 Hz to 3300 Hz, necessitating the aforementioned bandpass filter 154 in remote unit 87, which limits the frequency band of the signal transmitted to base unit 82 to this frequency range. In contrast, it usually is desired (but not mandatory) that classroom amplification systems operate over a bandwidth extending from approximately 200 Hz to above 7,000 or 8,000 Hz. Consequently, it is desirable to modify the telephone circuit filtering to accommodate this wider bandwidth. The method for accomplishing this depends on the specific circuits used in the particular unit adapted for use in the RF-type amplification system. An example of one typical telephone circuit, in which a simple modification can be made to the portable transmitter to attain the desired increase in bandwidth is now described.

To increase the transmitted bandwidth beyond that specified for telephones, that is, to increase the bandwidth beyond 300 Hz through 3300 Hz as is normally used for the telephone system, bandpass filter 154 can either be bypassed entirely or it can be modified by well known means to extend the bandwidth up to that generated by microphone 151 and amplified by preamplifier 153. In some types of cordless telephone base units, there may be additional filtering provided in speech network 121 (see FIG. 2). In this event, it may be required also to modify a filter (if present) in the speech network to obtain the desired bandpass response.

Techniques for accomplishing this increase in bandwidth are well known to those skilled in the art of sound communication. These techniques most usually involve some form of digital compression upstream of the bandpass filter followed by re-expansion after reception by the base unit, although the use of analog or digitally implemented "bucket-brigade" techniques, are also applicable. Conceptually, these techniques can be implemented by modifying the existing circuitry of the cordless telephone system being adapted for use in the amplification system or by adding a processing block acting on the speech and/or other sound signal being received from the microphone prior to delivering the signal to the above described circuits of the system. In this realization, wherein the compressed signal resulting from the extra processing may be in a digital form, it may be desirable to reconstitute the signal into an analog form prior to presenting it to the transmitter circuits of the remote unit 87. After reception in the base unit 82, the compressed signal can then be re-expanded by use of a separate processing block added to the existing base unit processing circuits described previously.

Referring specifically to digital techniques using bit compression/expansion, there are two classes of sound coder technologies which are applicable: (1) those referred generically to as "Vocoders", which apply specifically to speech signals produced by a single talker whose voice signal is not significantly corrupted by that of other sounds or another talker; and "Waveform Coders", which apply to more general signals in the auditory range including multiple voices, music, sirens and other sounds which may occur. While either of these compression-type systems may be used for the purposes of this invention, the techniques involved can differ significantly in cost and complexity of algorithms, in whether or not the methods are proprietary, in compatibility with other voice communication systems, the degree of effective compression they offer and, most importantly in the context of the present invention, in time delays introduced by processing type and the voice quality ultimately resulting.

Inasmuch as the amount of compression required in the system of the present invention is small, for example 2:1 to compress a 7 KHz signal into a 3.5 KHz bandwidth, and a low cost system with a small amount of delay, say less than 10 milliseconds, is desirable, the Waveform Coders are well suited to the requirements of the present invention. Waveform Coders are characterized by less complex algorithms, lower time delays, good voice quality and most suitable for small ratio compressions. While compatibility with other equipments is not of great concern in this application, there are a number of non-proprietary methods available such as the ITU G.722 SB-ADPCM:64, 56 AND 48 kbps method which is non-proprietary standardized technique used most commonly for hands-free telecommunications and yields a high quality speech/sound signal with 7 kHz bandwidth. As understood in the art, there are many other similar means available which are suitable to accomplish bandwidth expansion, which are either standardized for the telephone industry or customized by software purveyors.

It will be understood that modifications and variations of the above-described exemplary embodiment can be made without departing from the scope of the invention. In particular, more than one remote unit/base unit pair can be used in a single classroom. For example, it may be desirable to amplify both the voice of a teacher and the voice of a teacher's aid within the same room. In this case, both the teacher and the teacher's aid carry independent remote units, and two independent base units respectively receive signals from the two remote units at different frequencies. The two base units can be connected to a common (single) power amplifier system driving a common set of loudspeakers, or separate power amplification systems and/or loudspeakers can be used.

As explained above, a classroom amplification system remote unit employing cordless telephone technology receives a unique handshake code from a base unit each time the remote unit is placed in the base unit charging station for battery recharging. If a second remote unit is subsequently placed in the base unit charging station, the base unit will communicate only with the second remote unit, since the handshake code being used by the first remote unit is no longer the correct code (i.e., only the remote unit most recently placed in the charging station receives the current handshake code from the base unit). Accordingly, in the multiple remote unit/base unit pair environment, care must be taken to ensure that each base unit has most recently charged a different remote unit, so that each remote unit is using a valid handshake code corresponding to one of the base units.

More generally, an RF-type amplification system according to the present invention, such as a classroom amplification system, can employ the interference reduction/avoidance techniques found in cordless telephone systems while not necessarily being constructed with components from a cordless telephone. In particular, frequency identification, handshaking, voice signal descrambling, and channel scanning capabilities can be incorporated into any remote unit/base unit/power amplifier/loud speaker arrangement to minimize interference. Optionally, a single remote unit can be configured to communicate with multiple base units simultaneously, or multiple remote units can be configured to communicate with a single base unit, provided that control signals, such as handshake codes, are distributed among the remote units and base units by appropriate messaging.

Having described preferred embodiments of a method and apparatus for improving classroom amplification systems and other RF-type amplification systems, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An RF-type amplification system, comprising:
   a portable remote unit including: a microphone for detecting a voice and for generating corresponding voice signals; a central processing unit configured to generate control signals; a transmitter for generating first RF signals containing the voice signals and the control signals; an antenna configured to transmit the first RF signals and to receive second RF signals; and a receiver for detecting the second RF signals; and
   a base unit including: an antenna adapted to receive the first RF signals from the remote unit; a receiver for detecting the first RF signals and for separating the first RF signals into the voice signals and the control signals; a communications interface configured to deliver the voice signals to an external device; a code detector for identifying the control signals; a central processing unit for evaluating the control signals and for controlling delivery of the voice signals from the communications interface in accordance with values of the control signals; and a transmitter for generating the second RF signals containing control signals but no voice signals, said second RF signals being transmitted to said portable remote unit via the antenna of the base unit, thereby effecting one-way transmission of voice signals and two-way transmission of control signals between said portable remote unit and said base unit.

2. The amplification system according to claim 1, wherein the control signals include: a frequency identity code which identifies a transmit frequency of said portable remote unit; a handshake code uniquely identifying said portable remote unit as the source of said first RF signals; and a descrambling code used by said base unit to descramble the voice signals received in the first RF signals.

3. The amplification system according to claim 2, wherein said portable remote unit further comprises a rechargeable battery and said base unit further comprises a battery charger adapted to charge the rechargeable battery.

4. The amplification system according to claim 3, wherein:
   said base unit further comprises a memory coupled to the central processing unit of said base unit and adapted to store the handshake code; and
   said portable remote unit further comprises a memory coupled to the central processing unit of said portable remote unit, the handshake code being downloaded from the memory of said base unit to the memory of said portable remote unit when the rechargeable battery of said portable remote unit is being charged by the battery charger of said base unit.

5. The amplification system according to claim 1, further comprising:
   a DC voltage source which applies a constant bias voltage to the communications interface whenever the system is operating.

6. The amplification system according to claim 1, further comprising:
   an audio power amplifier receiving the voice signals from the communications interface and amplifying the voice signals; and
   a loudspeaker responsive to the amplified voice signals produced by said audio power amplifier, for projecting amplified, audible voice signals.

7. The amplification system according to claim 1, wherein said portable remote unit further comprises a housing configured to be carried on a person, said microphone being external to said housing.

8. The amplification system according to claim 1, wherein said portable remote unit further includes a channel scan selector for generating a scan code as one of said control signals, said base unit being responsive to the scan code to select a different transmit frequency for the transmitter of said portable remote unit.

9. The amplification system according to claim 1, wherein said portable remote unit further includes:
   a mute selector for preventing the communications interface from delivering the voice signals to an external device;
   an ON selector for activating the system; and
   an OFF selector for deactivating the system.

10. The amplification system according to claim 1, wherein said portable remote unit further comprises:
    a compressor circuit responsive to the voice signals received from the microphone for compressing a bandwidth of the voice signals to a compressed bandwidth; and
    a bandspass filter downstream of the compressor circuit and upstream of the transmitter of said portable remote unit, said bandpass filter receiving the compressed bandwidth voice signals and having a pass band corresponding to the compressed bandwidth;
    and wherein said base unit further comprises:
    an expander circuit responsive to the voice signals detected by the receiver of said base unit for expanding the compressed bandwidth of the voice signals.

11. The amplification system according to claim 10, wherein said compressor circuit and said expander circuit are one of: a vocoder and a waveform coder.

12. The amplification system according to claim 1, wherein the amplification system is a classroom amplification system for projecting a person's voice throughout a classroom, said portable remote unit being configured to be carried by the person.

13. The amplification system according to claim 12, wherein said classroom amplification system further includes:
    an audio power amplifier system receiving the voice signals from the communications interface of said base unit and amplifying the voice signals; and
    a loudspeaker system, including at least one loudspeaker disposed within the classroom, responsive to the amplified voice signals produced by said audio power amplifier system, for projecting amplified, audible voice signals throughout the classroom.

14. An method of amplifying sound, comprising the steps of:
    producing voice signals from a detected voice;
    generating first RF signals containing the voice signals and control signals;
    transmitting the first RF signals from a portable remote unit to a base unit;
    detecting the first RF signals at the base unit and separating the first RF signals into the voice signals and the control signals;
    delivering the voice signals from a communications interface of the base unit to an external device only if the control signals received by the base unit have predetermined values; and
    transmitting second RF signals from the base unit to the portable remote unit, wherein the second RF signals contain control signals but no voice signals, thereby effecting one-way transmission of voice signals and two-way transmission of control signals between the portable remote unit and the base unit.

15. The method according to claim 13, wherein the control signals include: a frequency identity code which identifies a transmit frequency of said portable remote unit; a handshake code uniquely identifying said portable remote unit as the source of said first RF signals; and a descrambling code used by said base unit to descramble the voice signals received in the first RF signals.

16. The method according to claim 15, further comprising the step of:
    charging a rechargeable battery of the portable remote unit with a battery charger of the base unit.

17. The method according to claim 16, further comprising the step of:
    downloading the handshake code from a memory of the base unit to a memory of the portable remote unit while the battery of the portable remote unit is being charged.

18. The method according to claim 14, further comprising the step of:
    applying a constant bias voltage to the communications interface whenever the base unit is operating.

19. The method according to claim 14, further comprising the steps of:
    amplifying the voice signals supplied from the communications interface; and
    projecting an amplified, audible sound from the amplified voice signals.

20. The method according to claim 14, further comprising the step of:

disposing at least a portion of the portable remote unit in a housing configured to be carried on a person.

21. The method according to claim 14, further comprising the step of:

sending a scan code from the portable remote unit to the base unit in response to user selection of a channel scan function;

progressively changing a frequency of an oscillator of the base unit to identify a transmission channel substantially free of interference;

transmitting a control code from the base unit to the portable remote unit indicating a new transmission channel; and transmitting the first RF signals at a frequency corresponding to the new transmission channel.

22. The method according to claim 14, further comprising the steps of:

sending a mute control code from the portable remote unit to the base unit in response to user selection of a mute function; and preventing the communications interface from delivering the voice signals to an external device in response to the mute control code.

23. The method according to claim 14, further comprising the steps of:

compressing a bandwidth of the voice signals to a compressed bandwidth;

passing the compressed bandwidth voice signals through a bandpass filter having a pass band corresponding to the compressed bandwidth prior to transmission to the base unit; and expanding the compressed bandwidth of the voice signals after reception by the base unit.

24. The method according to claim 14, further comprising the steps of:

disposing the portable remote unit on a person within a classroom;

disposing the base unit within the classroom;

amplifying the voice signals supplied from the communications interface; and projecting an amplified, audible sound from the amplified voice signals throughout the classroom.

* * * * *

UNITED STATES PATENT AND TRADEMARK OFFICE
CERTIFICATE OF CORRECTION

PATENT NO. : 6,397,037 C1
APPLICATION NO. : 90/009176
DATED : March 16, 2010
INVENTOR(S) : David Franklin et al.

It is certified that error appears in the above-identified patent and that said Letters Patent is hereby corrected as shown below:

Column 2, line 39, replace claim 25 with the following claim:

-- 25. *An RF-type room amplification system, comprising:*
*a portable remote unit including: a microphone for detecting a voice and for generating corresponding voice signals, wherein said amplification system operates over a bandwidth for the voice signals that includes frequencies beyond an upper audio signal frequency of 3300 Hz for telephony; a central processing unit configured to generate control signals; a transmitter for generating first RF signals containing the voice signals and the control signals; an antenna configured to transmit the first RF signals and to receive second RF signals; and a receiver for detecting the second RF signals; and*
*a base unit including: an antenna adapted to receive the first RF signals from the remote unit; a receiver for detecting the first RF signals and for separating the first RF signals into the voice signals and the control signals; a communications interface configured to deliver the voice signals to an external device; a code detector for identifying the control signals; a central processing unit for evaluating the control signals to determine if the voice signals are legitimate and derived from a proper remote unit and for controlling delivery of the voice signals from the communications interface in accordance with values of the control signals;*
*and a transmitter for generating the second RF signals containing control signals but no voice signals and for transmitting control signals but no voice signals to the portable remote unit, said second RF signals being transmitted to said portable remote unit via the antenna of the base unit, thereby effecting one-way transmission of voice signals and two-way transmission of control signals between said portable remote unit and said base unit;*
*an amplifier unit serving as said external device to receive said voice signals from the communications interface and amplify said received voice signals to an increased level sufficient for projection to said plurality of recipients within said room; and*
*room speakers disposed within said room and driven by said amplifier unit to project said amplified voice signals throughout said room for reception by said plurality of recipients within said room.* --

Column 2, line 42, replace claim 26 with the following claim:

-- 26. *The system of claim 25, wherein said room includes a classroom.* --

Signed and Sealed this

Nineteenth Day of October, 2010

David J. Kappos
*Director of the United States Patent and Trademark Office*

Column 2, line 46, replace claim 27 with the following claim:

-- 27. *The system of claim 26, wherein a time delay for the voice signals through the amplification system is within a range desirable for classroom amplification systems.* --

Column 2, line 49, replace claim 28 with the following claim:

-- 28. *A method of amplifying sound within a room amplification system, comprising the steps of:*
  *producing voice signals from a detected voice, wherein a bandwidth for the voice signals includes frequencies beyond an upper audio signal frequency of 3300 Hz for telephony;*
  *generating first RF signals containing the voice signals and control signals;*
  *transmitting the first RF signals from a portable remote unit to a base unit;*
  *detecting the first RF signals at the base unit and separating the first RF signals into the voice signals and the control signals;*
  *evaluating the control signals to determine if the voice signals are legitimate and derived from a proper portable remote unit;*
  *delivering the voice signals from a communications interface of the base unit to an external device only if the control signals received by the base unit have predetermined values;*
  *receiving said voice signals from the communications interface at an amplifier unit serving as the external device and amplifyng said received voice signals to an increased level sufficient for projection to said plurality of recipients within said room;*
  *projecting said amplified voice signals throughout said room for reception by said plurality of recipients within said room via room speakers disposed within said room and driven by said amplifier unit; and*
  *transmitting second RF signals from the base unit to the portable remote unit via a transmitter that transmits control signals but no voice signals to the portable remote unit, wherein the second RF signals contain control signals but no voice signals, thereby effecting one-way transmission of voice signals and two-way transmission of control signals between the portable remote unit and the base unit.* --

Column 2, line 52, replace claim 29 with the following claim:

-- 29. *The method of claim 28, wherein said room includes a classroom.* --

Column 2, line 55, replace claim 30 with the following claim:

-- 30. *The method of claim 29, wherein a time delay for processing the voice signals is within a range desirable for classroom amplification systems.* --

(12) EX PARTE REEXAMINATION CERTIFICATE (7406th)
United States Patent
Franklin et al.

(10) Number: US 6,397,037 C1
(45) Certificate Issued: Mar. 16, 2010

(54) METHOD AND APPARATUS FOR IMPROVING CLASSROOM AMPLIFICATION SYSTEMS AND OTHER RF-TYPE AMPLIFICATION SYSTEMS

(75) Inventors: David Franklin, Somerville, MA (US); Michael Steele, Seaford, NY (US)

(73) Assignee: Audiological Engineering Corporation, Somerville, MA (US)

Reexamination Request:
No. 90/009,176, Jun. 9, 2008

Reexamination Certificate for:
Patent No.: 6,397,037
Issued: May 28, 2002
Appl. No.: 09/424,915
Filed: Dec. 10, 1999

(22) PCT Filed: Jun. 2, 1998

(86) PCT No.: PCT/US98/11127
§ 371 (c)(1),
(2), (4) Date: Dec. 1, 1999

(87) PCT Pub. No.: WO98/56106
PCT Pub. Date: Dec. 10, 1998

Related U.S. Application Data

(60) Provisional application No. 60/048,329, filed on Jun. 2, 1997.

(51) Int. Cl.
*H04H 1/00* (2006.01)

(52) U.S. Cl. .................. 455/3.01; 455/3.06; 455/575
(58) Field of Classification Search ............. None
See application file for complete search history.

(56) References Cited

U.S. PATENT DOCUMENTS

| 4,706,274 A | 11/1987 | Baker et al. ............... 455/462 |
| 4,882,745 A | 11/1989 | Silver .................... 455/575.2 |
| 5,044,010 A | 8/1991 | Frenkiel et al. ........... 455/464 |
| 6,397,037 B1 | 5/2002 | Franklin et al. .......... 455/3.01 |

*Primary Examiner*—Linh M. Nguyen (57) ABSTRACT

An RF-type amplification system, such as a classroom amplification system, employs technology adapted from a cordless telephone system to overcome interference. The amplification system includes a portable remote unit (87) and a base unit (82). Remote unit (87) includes: a microphone (151) for detecting a voice and generating corresponding voice signals; a transmitter (160, 161) which generates RF signals containing the voice signals as well as control signals provided by the central processing unit (179) of remote unit (87), and an antenna (168) for transmitting the RF signals and for receiving RF signals from base unit (82). Base unit (82) includes an antenna (107) which receives the RF signals transmitted by the remote unit and a receiver (108, 114, 115, 117) which detects the RF signals and separates the RF signals into the voice signals and control signals. The control signals are identified by a code detector (118) of base unit (82) and evaluated by a CPU (130). If the values of the control signals are as expected, the voice signals are processed through a speech network (121) and provided at a communications interface to an audio power amplifier (147) which amplifies the voice signals and supplies the voice signals to speakers which audibly project the voice signals as sound. Base unit (82) further includes a transmitter (133, 135) for generating RF signals containing control signals, but no voice signals, that are transmitted to remote unit (87), thereby effecting one-way transmission of voice signals and two-way transmission of control signals between remote unit (87) and base unit (82).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–9, 12–22 and 24 are cancelled.

Claims 10 and 23 are determined to be patentable as amended.

New claims 25–30 are added and determined to be patentable.

Claim 11 was not reexamined.

10. [The amplification system according to claim 1, wherein said portable remote unit further comprises:] *An RF-type amplification system, comprising:*

*a portable remote unit including: a microphone for detecting a voice and for generating corresponding voice signals; a central processing unit configured to generate control signals; a transmitter for generating first RF signals containing the voice signals and the control signals; an antenna configured to transmit the first RF signals and to receive second RF signals; a receiver for detecting the second RF signals;* a compressor circuit responsive to the voice signals received from the microphone for compressing a bandwidth of the voice signals to a compressed bandwidth; and a bandspass filter downstream of the compressor circuit and upstream of the transmitter of said portable remote unit, said bandpass filter receiving the compressed bandwidth voice signals and having a pass band corresponding to the compressed bandwidth; *and*

[and wherein said base unit further comprises:]
  a base unit including: *an antenna adapted to receive the first RF signals from the remote unit; a receiver for detecting the first RF signals and for separating the first RF signals into the voice signals and the control signals;*
  an expander circuit responsive to the voice signals detected by the receiver of said base unit for expanding the compressed bandwidth of the voice signals; *a communications interface configured to deliver the voice signals to an external device; a code detector for identifying the control signals; a central processing unit for evaluating the control signals and for controlling delivery of the voice signals from the communications interface in accordance with values of the control signals; and a transmitter for generating the second RF signals containing control signals but no voice signals, said second RF signals being transmitted to said portable remote unit via the antenna of the base unit, thereby effecting one-way transmission of voice signals and two-way transmission of control signals between said portable remote unit and said base unit.*

23. [The method according to claim 14, further comprising the steps of:] *A method of amplifying sound, comprising the steps of:* producing voice signals from a detected voice;
compressing a bandwidth of the voice signals to a compressed bandwidth;
passing the compressed bandwidth voice signals through a bandpass filter having a pass band corresponding to the compressed bandwidth prior to transmission to [the] *a* base unit; [and]
*generating first RF signals containing the voice signals and control signals;*
*transmitting the first RF signals from a portable remote unit to the base unit;*
*detecting the first RF signals at the base unit and separating the first RF signals into the voice signals and the control signals;*
expanding the compressed bandwidth of the voice signals after reception by the base unit*;*
*delivering the voice signals from a communications interface of the base unit to an external device only if the control signals received by the base unit have predetermined values; and*
*transmitting second RF signals from the base unit to the portable remote unit, wherein the second RF signals contain control signals but no voice signals, thereby effecting one-way transmission of voice signals and two-way transmission of control signals between the portable remote unit and the base unit.*

*25. The RF-type classroom amplification system of claim 1, wherein said range desirable for classroom amplification systems includes delays under 10 milliseconds.*

*26. The RF-type classroom amplification system of claim 1, wherein said time delay for the voice signals through the amplification system is low to provide enhanced voice quality.*

*27. The RF-type classroom amplification system of claim 1, wherein said bandwidth for the voice signals extends to include frequencies of approximately 7000 Hz.*

*28. The method of claim 14, wherein said range desirable for classroom amplification systems includes delays under 10 milliseconds.*

*29. The method of claim 14, wherein said time delay for processing the voice signals is low to provide enhanced voice quality.*

*30. The method of claim 14, wherein said bandwidth for the voice signals extends to include frequencies of approximately 7000 Hz.*

* * * * *